United States Patent [19]

Senso et al.

[11] Patent Number: 5,481,306

[45] Date of Patent: Jan. 2, 1996

[54] DISPLAY CIRCUIT FOR DISPLAYING AN HDTV SIGNAL AS TWELVE NTSC SIGNALS AND FOR DISPLAYING AN INDEPENDENT NTSC SIGNAL

[75] Inventors: Hitoshi Senso; Yoshio Arai; Masao Fukuda, all of Tokyo, Japan

[73] Assignee: Pioneer Electronic Corporation, Tokyo, Japan

[21] Appl. No.: 125,139

[22] Filed: Sep. 23, 1993

Related U.S. Application Data

[60] Continuation of Ser. No. 879,317, May 7, 1992, abandoned, which is a division of Ser. No. 725,100, Jul. 3, 1991, abandoned, which is a division of Ser. No. 440,169, Nov. 22, 1989, Pat. No. 5,111,303.

[30] Foreign Application Priority Data

Feb. 27, 1989 [JP] Japan ................................. 1-43171
Feb. 27, 1989 [JP] Japan ................................. 1-43173

[51] Int. Cl.⁶ ............................................. H04N 5/66
[52] U.S. Cl. ...................................... 348/383; 345/903
[58] Field of Search ................................ 358/140, 160, 358/242, 335, 310, 87, 93, 188, 134; 360/33.1; 348/383, 705, 564, 706, 588; 345/1, 4, 55, 903; H04N 9/8, 5/66, 5/92/5/68

[56] References Cited

U.S. PATENT DOCUMENTS

| | | | |
|---|---|---|---|
| 3,983,328 | 9/1976 | Newell | 178/6.8 |
| 4,644,387 | 2/1987 | Bell et al. | 358/181 |
| 4,660,096 | 4/1987 | Arlan | 358/93 |
| 4,668,985 | 5/1987 | Kurashige et al. | 358/134 |
| 4,695,135 | 9/1987 | Den Exter Blokland et al. | 548/383 |
| 4,800,376 | 1/1989 | Suga et al. | 340/721 |
| 4,901,155 | 2/1990 | Hara et al. | 358/230 |
| 4,939,586 | 7/1990 | Nabati et al. | 358/342 |
| 4,999,710 | 3/1991 | Senso et al. | 358/160 |
| 5,010,413 | 4/1991 | Bahr | 358/242 |
| 5,065,243 | 11/1991 | Katagiri | 358/140 |

FOREIGN PATENT DOCUMENTS

| | | | |
|---|---|---|---|
| 0074696 | 3/1983 | European Pat. Off. | 358/242 |
| 0224366 | 6/1987 | European Pat. Off. | |
| 3222266 | 12/1983 | Germany | 358/335 |
| 0034215 | 3/1979 | Japan | 360/33.1 |
| 0101481 | 6/1982 | Japan . | |
| 0165882 | 8/1985 | Japan | 358/140 |
| 0084683 | 4/1987 | Japan . | |
| 0152289 | 6/1988 | Japan . | |
| 0029064 | 1/1989 | Japan | 358/87 |
| 0041385 | 2/1989 | Japan . | |

*Primary Examiner*—David E. Harvey
*Attorney, Agent, or Firm*—Sughrue, Mion, Zinn, Macpeak & Seas

[57] ABSTRACT

A video signal recording system is provided in which the number of horizontal scanning lines of a high-definition television system video signal is converted to be M times as large as the number of horizontal scanning lines of an ordinary television video signal. The converted video signal is divided into M vertical sections and N horizontal sections so that M×N sections of the divided video signal are separately recorded onto M×N recording media respectively. In this way, a high-definition television system video signal can be displayed on a plurality of ordinary television receivers without losing the high-definition television system picture quality.

10 Claims, 4 Drawing Sheets

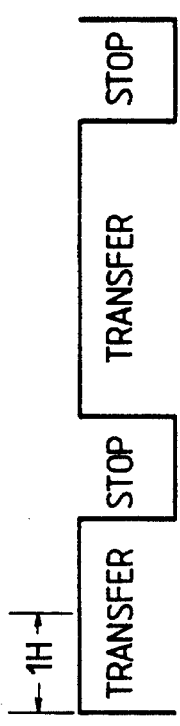
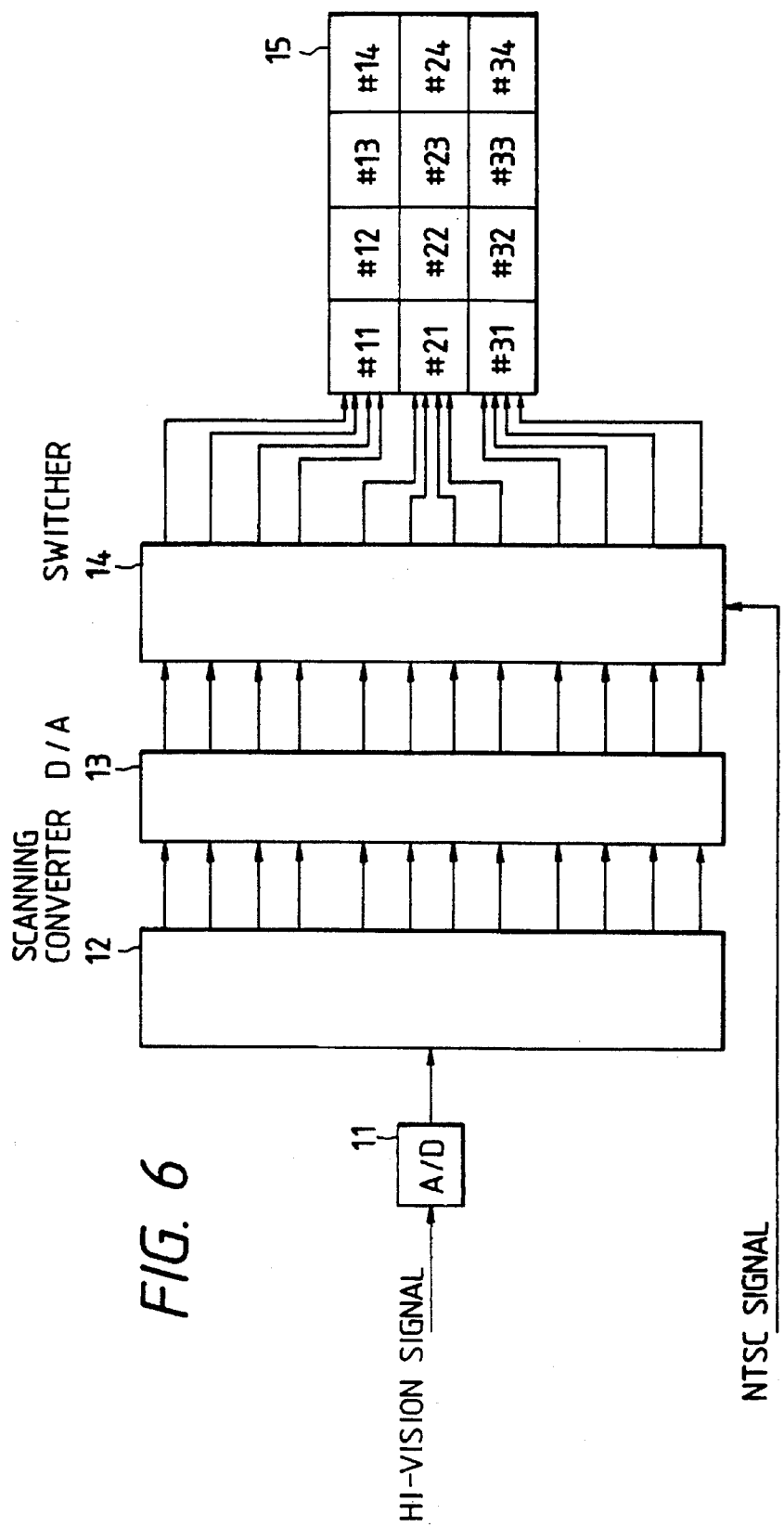
FIG. 5
FIG. 6

5,481,306

DISPLAY CIRCUIT FOR DISPLAYING AN HDTV SIGNAL AS TWELVE NTSC SIGNALS AND FOR DISPLAYING AN INDEPENDENT NTSC SIGNAL

This is a Continuation of application Ser. No. 07/879,317 filed May 7, 1992 (now abandoned), which is Divisional of U.S. application Ser. No. 07/725,100, filed Jul. 3, 1991 (now abandoned), which is a Divisional No. 07/440,169, filed Nov. 22, 1989, now U.S. Pat. No. 5,111,303.

BACKGROUND OF THE INVENTION

The present invention relates to a picture signal recording apparatus in which one picture area in a high-definition television system is divided into a plurality of picture areas in an existing ordinary television system, and the divisional picture areas are recorded on a plurality of recording media respectively. The present invention further relates to a picture display system in which the divisional picture areas are displayed on a plurality of existing ordinary television receivers, respectively.

As a new television system replacing the existing ordinary television system, there has been proposed a high-definition television system, such as, for example, a Hi-Vision system, in which not only the picture quality and sound quality are improved, but also high visual mental effects such as realistic feeling, powerfulness, etc., far superior to those in the existing ordinary television system can be produced.

The Hi-Vision system differs significantly in picture-scene system, scanning system, and sound system, from the existing television system, for example, an NTSC system. As a result, a Hi-Vision signal cannot be reproduced as it is by use of an existing NTSC system television receiver. Accordingly, it has been proposed that the difference between the two systems, for example, the number of effective scanning lines, the aspect ratio, the field frequency, etc., be accommodated so that a signal of the Hi-Vision system is displayed after being converted into an NTSC signal.

FIGS. 1(a) and 1(b) are views showing examples of output pictures of a Hi-Vision/NTSC converter (a down converter). In FIG. 1(a), the 1035 effective scanning lines of the Hi-Vision system are reduced by about one half so as to be assigned to the 483 effective scanning lines of the NTSC system, and the picture elements are cancelled by 10% at left and right sides of the picture without changing the picture aspect ratio of 4:3 of the NTSC system, thereby obtaining an NTSC output. In this mode, the cancelled portions can be desirably selected.

In the example shown in FIG. 1(b), the 1035 effective scanning lines in the Hi-Vision system are reduced to about one-third so as to be assigned to the 362 effective scanning lines in the NTSC system, and an NTSC output is obtained without changing the picture aspect ratio of 16:9 of the Hi-Vision system. In this mode, the effective scanning lines are blanked by 10% at both the upper and lower portions of the picture area while the horizontal length agrees with that of the picture area of the Hi-Vision system.

In the conventional systems in which a Hi-Vision signal is displayed after being converted into an NTSC signal, there has been a disadvantage in that a picture having the high picture quality of the Hi-Vision system cannot be reproduced because the conversion of the Hi-Vision signal into the NTSC signal is made by reducing the horizontal scanning lines of the Hi-Vision signal. As a result, a picture having the composition expected in the Hi-Vision system cannot be obtained in the mode in which conversion is made by partially cutting off the picture.

SUMMARY OF THE INVENTION

It is therefore an object of the present invention to record a video signal according to a high-definition television system onto a recording medium after converting the video signal into a video signal according to the existing ordinary television system while maintaining the high quality of the former.

It is another object of the present invention to display a picture according to the high-definition television system by use of an existing ordinary television receiver while maintaining the high quality of the picture.

In order to attain the above objects, according to an aspect of the present invention, the video signal recording system is arranged so that the number of horizontal scanning lines of a high definition television system video signal is converted into M times as large as the number of horizontal scanning lines of a video signal according to an existing ordinary television system. The converted video signal is divided into M sections in the vertical direction and into N sections in the horizontal direction so that M×N sections of the divided video signal are separately recorded onto M×N recording media, respectively.

According to another aspect of the present invention, in the case where a Hi-Vision system is converted into an NTSC system, the video signal recording system is arranged so that the number of horizontal scanning lines of a video signal according to the Hi-Vision system is converted into three times as large as the number of horizontal scanning lines of a video signal according to the NTSC system; and the converted video signal is divided into three sections in the vertical direction and into four sections in the horizontal direction so that the twelve (= 3×4) sections of the divided video signal are separately recorded onto twelve recording media, respectively.

According to a further aspect of the present invention, the picture display system is arranged so that a video signal according to a high-definition television system is divided into a plurality of video signals according to an existing ordinary television system, whereby one picture according to the high-definition television system is displayed on one picture area constituted by a plurality of existing ordinary television receivers, and another picture according to an existing ordinary television system and different from the one picture is selectively displayed on at least one of the plurality of existing ordinary television receivers.

BRIEF DESCRIPTION OF THE DRAWINGS

FIG. 5 is a timing chart for explaining the operation of FIG. 4; and

FIG. 6 is a diagram showing the configuration of an embodiment of the picture display system according to the present invention.

DETAILED DESCRIPTION OF THE INVENTION

Referring to FIG. 2 showing the picture-area configurations, the operation of the present invention will be described. In the following, description will be made as to cases where a Hi-Vision system and an NTSC system are applied to the present invention as a high-definition television system and as an existing ordinary television system, respectively.

Figure 1A:
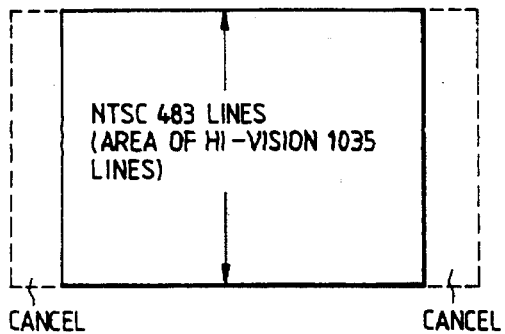
FIGS. 1(a) and 1(b) are views showing examples of output pictures of down converters, respectively.
Figure 1B:
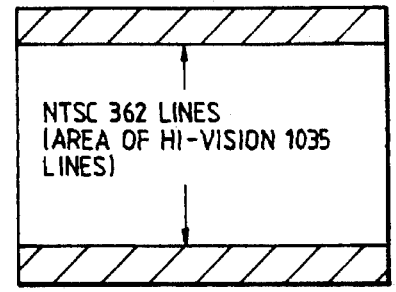
Figure 2A:
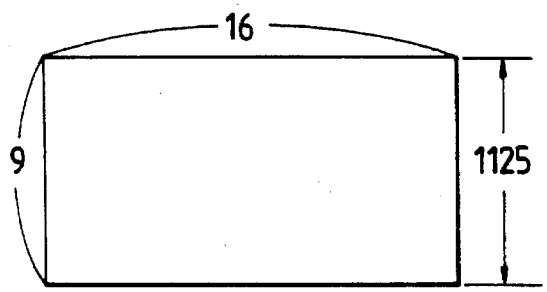
FIGS. 2(a) through 2(c) are views of picture area configurations for explaining the operation of the present invention.

According to the basic Hi-Vision system, as shown in FIG. 2(a), the aspect ratio is 16:9, and the number of horizontal scanning lines in one frame is 1125, of which the number of the horizontal scanning lines in an available picture area appearing on an actual picture area is 1035.

Figure 2B:
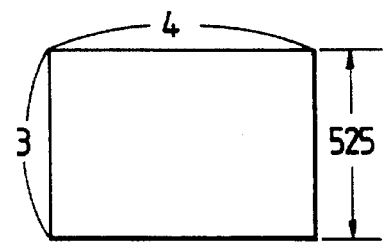

On the other hand, according to the NTSC system, as shown in FIG. 2(b), the aspect ratio is 4:3, and the number of horizontal scanning lines in one frame is 525 of which the number of the horizontal scanning lines in an available picture area is 483.

Figure 2C:
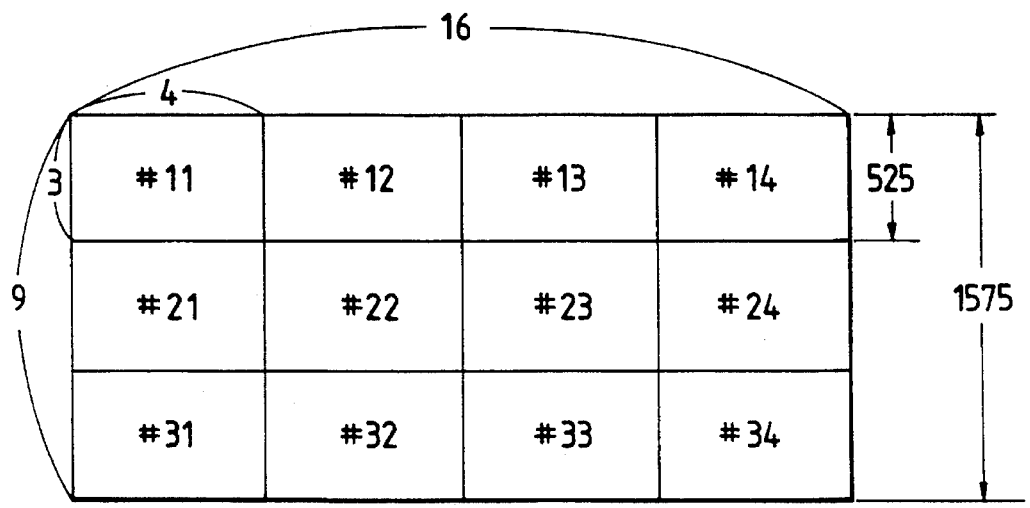

According to the present invention, in order to reproduce a high-grade picture in the Hi-Vision system by use of NTSC television receivers, a picture area according to the Hi-Vision system is divided in the vertical direction into three sections and in the horizontal direction into four sections, that is, it is divided into twelve sections in total as shown in FIG. 2(c). The twelve divisional sections of the picture are reproduced respectively by twelve television receivers. Since the aspect ratio of each of the divisional picture sections is 4:3, the aspect ratio of the whole picture area is 16:9 which agrees with the aspect ratio according to the Hi-Vision system.

In this case, since the number of the horizontal scanning lines of each of the divisional picture sections is 525, 1575 (= 525×3) horizontal scanning lines are required in order to display one picture on the twelve picture sections. Since the number of the horizontal scanning lines according to the Hi-Vision system is 1125, conversion of scanning lines is performed at a ratio of 5:7 to increase the number of scanning lines from 1125 to 1575.

Of the thus obtained 1575 horizontal scanning lines, the first one-third 525 horizontal scanning lines are divided into four sections which are successively assigned to four picture areas #11 through #14 on the upper stage, the next one-third 525 horizontal scanning lines are similarly divided into four sections which are successively assigned to four picture areas #21 through #24 on the middle state, and the last one-third 525 horizontal scanning lines are similarly divided into four sections which are successively assigned to four picture areas #31 through #34 on the lower stage.

In the video signal recording system according to the present invention, the picture on each of the thus assigned picture areas is recorded on one recording medium, for example, a video disk or a video tape. If the twelve video signals respectively separately recorded on the corresponding twelve recording media are reproduced on twelve NTSC television receivers by use of twelve reproducing apparatuses respectively at the same time, one picture according to the Hi-Vision system can be reproduced by use of the twelve NTSC television receivers while maintaining the high-grade property of the Hi-Vision picture.

In the picture display system according to the present invention, one picture according to the Hi-Vision system constituted by such assigned picture areas as described above is reproduced by using twelve NTSC receivers. Since each picture area is constituted by an NTSC television receiver, it is possible that a picture of the NTSC signal other than the picture of the Hi-Vision system is selectively displayed by at least one of the NTSC television receivers to thereby obtain a composite picture composed of pictures according to the Hi-Vision system and the NTSC system, respectively.

Referring to the drawings, embodiments of the present invention will be described hereunder.

Figure 3:
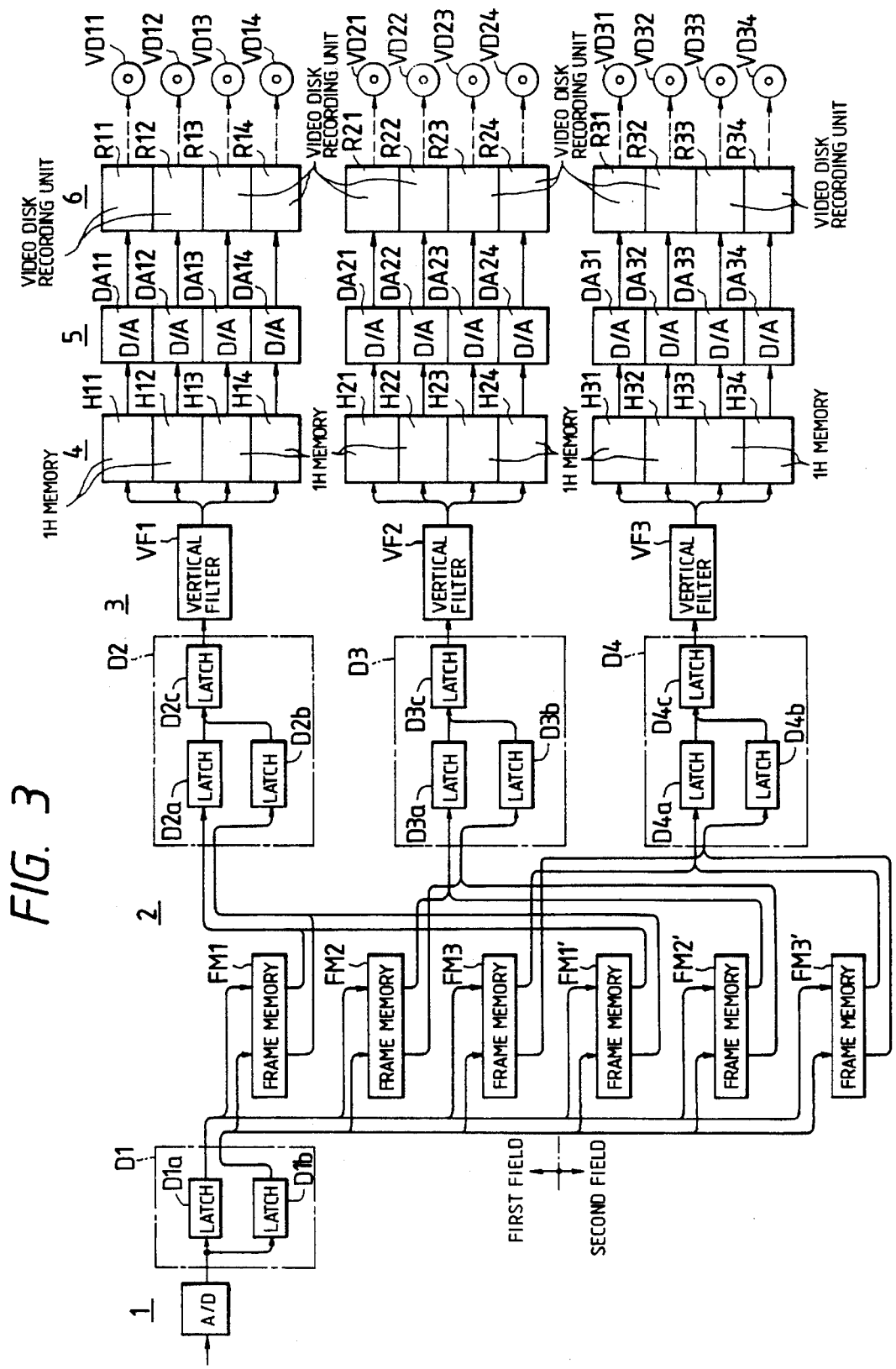
FIG. 3 is a diagram showing the configuration of an embodiment of the video signal recording system according to the present invention.

FIG. 3 is a diagram showing the configuration of an embodiment of the video signal recording system according to the present invention.

The embodiment is constituted by an A-D converter portion 1, a vertical dividing portion 2, a scanning-line converting portion 3, a horizontal dividing portion 4, a D-A converter portion 5, and a recording portion 6. The A-D converter portion 1 converts an input Hi-Vision signal into a digital Hi-Vision signal. The vertical dividing portion 2 serves to vertically divide the digital Hi-Vision signal converted by the A-D converter portion 1 into three sections of the digital Hi-Vision signal for every frame and stores the three divisional sections of the Hi-Vision signal for every free. The scanning-line converting portion 3 converts the horizontal scanning lines of each of the three sections of the digital Hi-Vision signal for each frame into the horizontal scanning lines according to the NTSC system at the rate of seven horizontal scanning lines according to the NTSC system for five horizontal scanning lines of the Hi-Vision signal. The horizontal dividing portion 4 divides the converted horizontal scanning lines of each of the three sections into four sections in the horizontal direction to thereby obtain twelve sets of data of horizontal scanning lines for every frame. The D-A converter portion 5 converts the twelve sets of horizontal scanning line data for every frame respectively into twelve sets of video signals according to the NTSC system for every frame. The recording portion 6 records the twelve sets of video signals onto twelve recording media, respectively.

More specifically, the A-D converter portion 1 is arranged to convert analog data of an input Hi-Vision signal into digital data of 8 bits based on a clock $\phi 1$ (for example, 48.6 MHz). The input Hi-Vision signal may be, for example, an output of a Hi-Vision VTR, an output of telecine equipment for converting a film picture into a Hi-Vision signal, an output of a MUSE decoder for converting a MUSE signal transmitted from a broadcasting satellite into a Hi-Vision signal, or the like.

The vertical dividing portion 2 is constituted by an input latch circuit D1, frame memories FM1 through FM3, frame memories FM1' through FM3', and output latch circuits D2, D3 and D4. The input latch circuit D1 serves to latch the digital data of the Hi-Vision signal A-D converted by the A-D converter portion 1. The frame memories FM1 through FM3 serve to vertically divide the digital data of horizontal scanning lines for the first field of the Hi-Vision signal latched in the latch circuit D1 into three sections, the three divisional sections of the digital data of horizontal scanning lines for the first field being stored in the frame memories FM1 through FM3, respectively. The frame memories FM1' through FM3' serve to store the three divisional sections of the data of horizontal scanning lines for the second field similarly to the frame memories FM1 through FM3. The output latch circuits D2, D3 and D4 serve to combine the digital data of horizontal scanning lines stored in the frame memories FM1 and FM1', to combine the digital data of horizontal scanning lines stored in the frame memories FM2 and FM2', and to combine the digital data of horizontal scanning lines stored in the frame memories FM3 and FM3', respectively. The thus combined digital data of horizontal scanning lines are fed to the scanning-line converting portion 3.

The input latch circuit D1 is constituted by latch circuits D1a and D1b for latching the A-D converted input Hi-Vision signal at negative and positive edges of a clock $\phi 2$ (for example, 24.3 MHz), respectively. The output latch circuit D2 is constituted by a Latch circuit D2a for latching the data of scanning lines for the first part of the first field, a latch circuit D2b for latching the data of scanning lines for the first part of the second field, and a latch circuit D2c for combining the respective outputs of the latch circuits D2a and D2b. The output latch circuit D3 is constituted by a latch circuit D3a for latching the data of scanning lines for the second part of the first field, a latch circuit D3b for latching the data of scanning lines for the second part of the second field, and a latch circuit D3c for combining the respective outputs of the latch circuit D3a and D3b. The output latch circuit D4 is constituted by a latch circuit D4a for latching the data of scanning lines for the third part of the first field, a latch circuit D4b for latching the data of scanning lines for the third part of the second field, and a latch circuit D4c for combining the respective outputs of the latch circuits D4a and D4b.

In the thus configured vertical dividing portion 2, the first one-third, the second one-third, and the last one-third of the data of the horizontal scanning lines for the first field produced from the latch circuit D1a are written in the memories FM1, FM2, and FM3, respectively, at the timing of the negative edge of the clock $\phi 2$, while the data of the horizontal scanning lines for the same field produced from the latch circuit D1b are written in the memories FM1, FM2 and FM3, respectively, at the timing of the positive edge of the clock $\phi 2$. Thus, three divisional sections of the data of the horizontal scanning lines for the first field are stored in the memories FM1 through FM3, respectively. However, in the scanning-line convening portion 3, seven successive horizontal scanning lines are subject to operational processing to generate one horizontal scanning line, as will be described later. Accordingly, taking the case in which seven successive horizontal scanning lines occur over two successive frame memories, for example, FM1 and FM2, into consideration, the last three horizontal scanning lines (H) to be written into the upper state frame memory FM1 are simultaneously written also into the middle stage frame memory FM2. This applies to the other two successive frame memories, that is, the middle stage frame memory FM2 and the lower stage frame memory FM3, and the lower stage frame memory FM3 and the upper stage frame memory FM1.

Similar to the data of the horizontal scanning lines for the first field described above, the data of the horizontal scanning lines for the second field are stored in the frame memories FM1' through FM3', respectively.

Thus, the vertically divided three divisional sections of the data of horizontal scanning lines of the Hi-Vision signal for the first and second field, that is, for one free, are stored in the frame memories FM1 through FM3 and FM1' through FM3' of the vertical dividing portion 2.

Next, the data of scanning lines written in the upper stage frame memory FM1 for the first field are read out at negative and positive edges of a clock signal of a clock $\phi 3$ (for example, 11.3 MHz), respectively, and latched by the latch circuits D2a and D2b of the output latch circuit 2, respectively. The data latched by the latch circuits D2a and D2b are combined with each other by the latch circuit D2c actuated by the clock signal of a clock $\phi 4$ (for example, 22.7 MHz) and the combined data are fed to a vertical filter VF1 constituting the scanning-line converting portion 3. The data stored in the upper stage frame memory FM1' for the second field are similarly fed to the same vertical filter VF1 through the same latch circuit D2.

The data stored in the middle stage frame memories FM2 and FM2' for the first and second fields are similarly fed to a vertical filter VF2 through the latch circuit D3, and the data stored in the lower stage frame memories FM3 and FM3' are similarly fed to a vertical filter VF3 through the latch circuit D3.

The scanning-line converting portion 3 is constituted by the vertical filter VF1–VF3 having the same structure so as to convert the number of horizontal scanning lines at a ratio of 5:7 in each of the three divisional sections of the data of the horizontal scanning lanes vertically divided by the vertical dividing portion 2.

Figure 4:
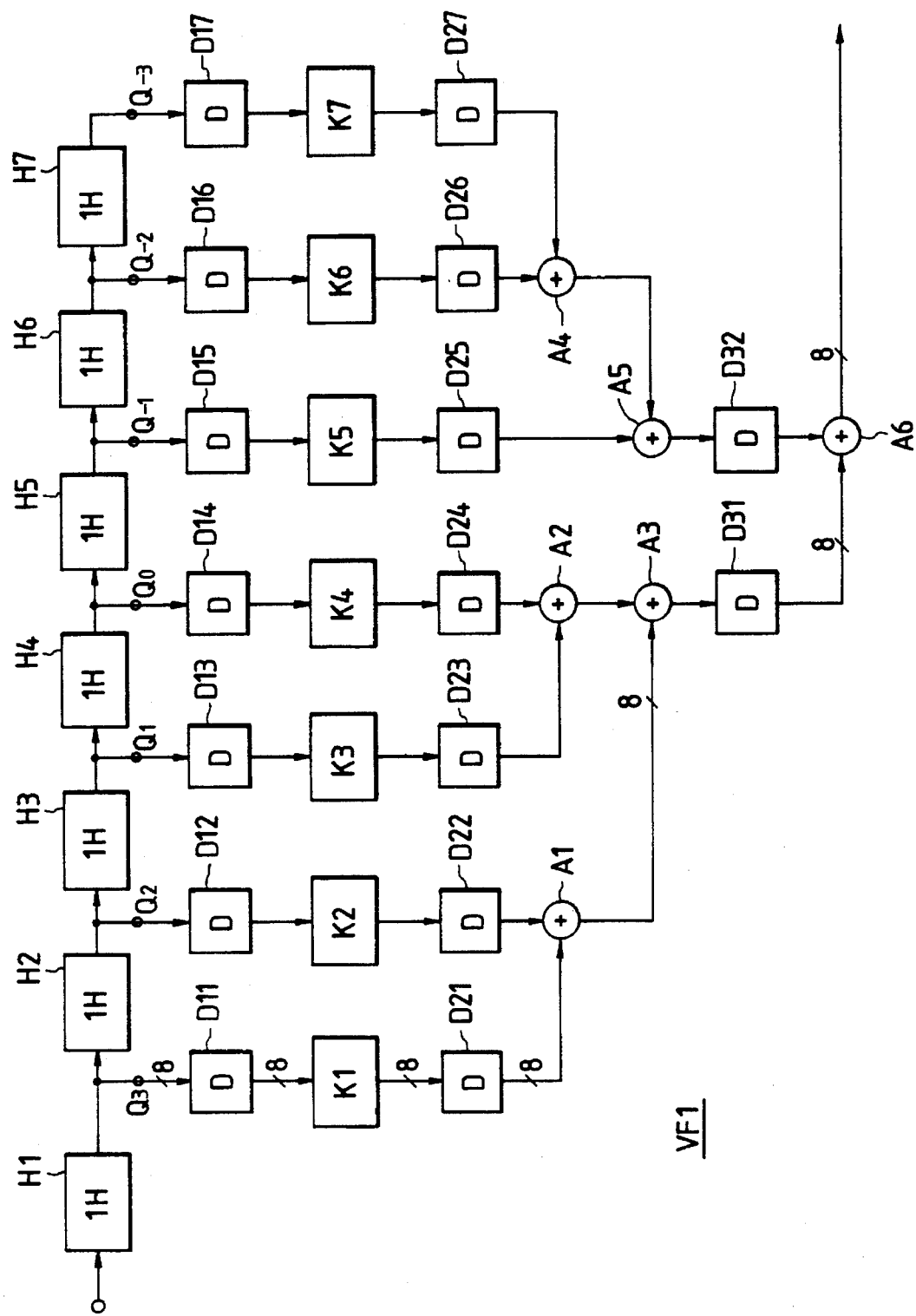
FIG. 4 is a diagram showing the configuration of a vertical filter of FIG. 3.

FIG. 4 shows the configuration of the vertical filter VF1. The vertical filter VF1 is constituted by seven 1H memories H1 through H7 each for delaying input data by 1H, the 1H memories H1 through H7 being connected in series. The respective outputs of the memories H1 through H7 are supplied, through latch circuits D11 through D17, to coefficient circuits K1 through K7 each constituted by a PROM for multiplying the input data thereto by a predetermined coefficient. The respective outputs of the coefficient circuits K1 through K7 are fed to latch circuits D21 through D27. The respective outputs of the latch circuits D21 through D24 are added to each other by adders A1 through A3, and the sum, that is the output of the adder A3, is supplied to a latch circuit D31. On the other hand, the respective outputs of the latch circuits D25 through D27 are added to each other by adders A4 and A5, and the sum, that is the output of the adder A5, is supplied to a latch circuit D32. The respective data thus latched in the latch circuits D31 and D32 are finally added to each other by an adder A6, and the sum, that is the output of the adder A6, is output. All the circuits constituting the vertical filter VF1 are driven by the signal of the clock $\phi 4$, and each of the coefficient circuits K1 through K7 changes the coefficient at a period of 7H.

In the thus configured vertical filter VF1, assuming that a signal produced from a 1H memory in a certain 1H period and a signal produced from the same memory In the next 1H period are represented by $Q_a$ and $Q_{n+1}$ respectively, then the outputs Pi are expressed by the following equations:

$$P_0 = h_{-21}Q_{-3} + h_{-14}Q_{-2} + h_{-7}Q_{-1} + h_0Q_0 + h_7Q_1 + h_{14}Q_2 + h_{21}Q_3$$
$$P_1 = h_{-19}Q_{-2} + h_{-12}Q_{-1} + h_{-5}Q_0 + h_2Q_1 + h_9Q_2 + h_{16}Q_3 + h_{23}Q_4$$
$$P_2 = h_{-24}Q_{-2} + h_{-17}Q_{-1} + h_{-10}Q_0 + h_{-3}Q_1 + h_4Q_2 + h_{11}Q_3 + h_{18}Q_4$$
$$P_3 = h_{-22}Q_{-1} + h_{-15}Q_0 + h_{-8}Q_1 + h_{-1}Q_2 + h_6Q_3 + h_{13}Q_4 + h_{20}Q_5$$
$$P_4 = h_{-20}Q_0 + h_{-13}Q_1 + h_{-6}Q_2 + h_1Q_3 + h_8Q_4 + h_{15}Q_5 + h_{22}Q_6$$
$$P_5 = h_{-18}Q_1 + h_{-11}Q_2 + h_{-4}Q_3 + h_3Q_4 + h_{10}Q_5 + h_{17}Q_6 + h_{24}Q_7$$
$$P_6 = h_{-23}Q_1 + h_{-16}Q_2 + h_{-9}Q_3 + h_{-2}Q_4 + h_5Q_5 + h_{12}Q_6 + h_{19}Q_7$$
$$P_7 = (P_0) = h_{-21}Q_2 + h_{-14}Q_3 + h_{-7}Q_4 + h_0Q_5 + h_7Q_6 + h_{14}Q_7 + h_{21}Q_8$$

Where $h_n$ designates an impulse response of the filter, and $h_n = h_{-n}$. Thus, the seven successive horizontal scanning lines are multiplied by predetermined coefficients respectively and added to each other so that one new horizontal scanning line is generated and supplied to the horizontal dividing portion 4.

FIG. 5 is a timing chart for explaining the operation for converting the horizontal scanning lines at a ratio of 5:7. Each 1H memory repeats the operation in which data is transferred in the first 2H period, no data is transferred in the next 1H period, data is transferred in the further next 3H period, and data transfer is stopped in the still further next 1H period. However, in each period, the constant in each coefficient circuit is changed every H and the output is operated every H, so that seven new horizontal scanning lines are generated from every five horizontal scanning lines.

The horizontal dividing portion 4 serves to divide, into four sections in the horizontal direction, the data of scanning lines produced from each of the vertical filters VF1 through VF3 constituting the scanning-line converting portion 3. More specifically, the output of the vertical filter VF1 is horizontally divided into four sections, the four divisional sections being stored in 1H memories H11 through H14 in accordance with the clock signal of the clock φ4. Similarly, the respective outputs of the vertical filters VF2 and VF3 are stored in 1H memories H21 through H24 and H31 through H34, respectively. Each of the 1H memories H11 through H34 includes two 1H memories so that the operation of writing the data into one 1H memory on the basis of the clock signal of the clock φ4 and the operation of reading the data from the other 1H memory on the basis of the clock signal of the clock φ5 (for example, 5.67 MHz) are alternately performed.

Thus, the twelve sets of data of horizontal scanning lines for one picture area respectively stored in the corresponding twelve 1H memories H11 through H14, H21 through H24, and H31 through H34 are supplied to the D-A converter portion 5 in which those twelve sets of data of horizontal scanning lines for one picture area are respectively converted into 12 sets of video signals of the NTSC system by D-A converters DA11 through DA14, DA21 through DA24, and DA31 through DA34 provided corresponding to the 1H memories H11 through H14, H21 through H24 and through H35, respectively. The respective outputs of the D-A converters DA11 through DA14, DA21 through DA24, and DA31 through DA34 are supplied to video disk recording units R11 through R14, R21 through R24, and R31 through R35 constituting the recording portion 6. In the recording units R11 through R14, R21 through R24, and R31 through R34, the twelve sets of NTSC signals are recorded on twelve video disks VD11 through VD14, VD21 through VD24, and VD31 through VD34, respectively.

More specifically, the four sets of NTSC signals corresponding to the picture areas #11 through #14 shown at the upper stage in FIG. 2(c) are stored on the video disks VD11 through VD14, the four sets of NTSC signals corresponding to the picture areas #21 through #24 shown at the middle stage in FIG. 2(c) are stored on the video disks VD21 through VD24, and the four sets of NTSC signals corresponding to the picture areas #31 through #34 shown at the lower stage in FIG. 2(c) are stored on the video disks VD31 through VD34.

The twelve video disks VD11 through VD14, VD21 through VD24, and VD31 through VD34 are simultaneously reproduced by means of twelve video disk players respectively and are simultaneously displayed on the twelve NTSC television receivers respectively, so that a high-grade picture according to the Hi-Vision system can be reproduced by means of the television receivers according to the NTSC system.

In the video signal recording system according to the present invention, one picture according to the high-definition television system is divided into a plurality of sections of pictures compatible with the existing television system. The divisional sections of pictures are recorded on a plurality of recording media, and the recorded divisional sections of pictures are reproduced by means of the existing television receivers, so that the picture according to the high-definition television system can be reproduced with high-grade properties by use of the existing television receivers. Further, since the converted video signals are reproduced after once being recorded on recording media, the reproducing can be carried out by means of a simply-configured reproduction system according to the existing television reproducing system.

FIG. 6 is a view showing the configuration of an embodiment of the picture display according to the present invention.

The picture display system of this embodiment is constituted by an A-D converter portion 11 for converting a Hi-Vision signal into digital data; a scanning converter 12 for dividing the scanning line data of the Hi-Vision signal converted by the A-D converter portion 11 into three sections in the vertical direction and four sections in the horizontal direction for every frame so as to generate twelve sets of scanning-line data for every frame; a D-A converter portion 13 for converting the twelve sets of scanning line data into twelve sets of video signals according to the NTSC system; a switcher 14 for selectively switching between the twelve sets of converted NTSC signals and the other NTSC signals; and a display portion 15 having twelve NTSC television receivers for displaying the twelve sets of NTSC signals at the same time.

The scanning converter 12 is constituted by a vertical dividing portion 2, a scanning-line converting portion 3, and a horizontal dividing portion 4. Those constituent portions 2, 3 and 4 have been already illustrated in FIG. 3 and therefore the description about them will be omitted.

The operation of this embodiment will be described hereunder.

The A-D converter portion 11 converts an input Hi-Vision signal into digital data of 8 bits on the basis of a clock φ1 (for example, 48.6 MHz). The input Hi-Vision signal may be, for example, an output of a Hi-Vision VTR, an output of telecine equipment for converting a film picture into a Hi-Vision signal, an output of a MUSE decoder for converting a MUSE signal transmitted from a broadcasting satellite into a HA-Vision signal, or the like. The converted Hi-Vision signal is supplied to an input latch circuit D1 of the scanning converter 12.

The twelve sets of horizontal scanning-line data of one picture area divided by the scanning converter 12 into three sections in the vertical direction and four sections in the horizontal direction are then converted respectively into twelve sets of NTSC signals by the D-A converting portion 13, and the D-A converted NTSC signals are simultaneously displayed on the display portion 15 constituted by the twelve NTSC television receivers through the switcher 14.

By substituting a part of the twelve sets of NTSC signals by other ordinary NTSC signals such as broadcasting signals according to the NTSC system, output signals of a video camera, or the like, through the switcher 14, it is possible to realize a composite picture composed of the Hi-Vision signals and a picture of the ordinary NTSC signals.

In the picture display according to the present invention, a picture of the high-definition television system can be displayed by use of a plurality of the existing ordinary television receivers while maintaining the high-grade property of the high-definition television system, and a composite picture composed of a picture of the high-definition television system and a picture of the existing television system can be obtained.

Although the case in which the Hi-Vision system is converted into the NTSC system has been described in the above embodiments, the present invention is of course applicable to a case in which, for example, an HD-MAC system is converted into a PAL system or a SECAM system.

What is claimed is:

1. A method for selectively displaying a high definition television system picture using a picture display system comprising a plurality of ordinary television receivers and a switch separate from said receivers, comprising the steps of:

A-D converting a high definition television system signal to provide A-D converted signals;

dividing said A-D converted signals into a plurality of video signals according to an existing ordinary television system;

D/A converting said plurality of video signals to provide D/A converted video signals;

displaying a portion of said high definition television system picture on at least one of said plurality of existing ordinary television receivers comprising a portion of a display area in accordance with at least one of said D/A converted video signals; and controlling said switch of said picture display system to selectively display another portion of said high definition television system picture, in accordance with said D/A converted video signal, and at least one ordinary television system picture, different from said another portion of said high definition television system picture, on a different at least one of said plurality of existing ordinary television receivers comprising another portion of said display area.

2. A method as claimed in claim 1, wherein said high definition television system signal is a Hi-Vision signal and said existing ordinary television system is an NTSC signal-type system.

3. A method as claimed in claim 1, wherein said dividing step divides said high-definition television system signal into said plurality of video signals by scan converting the lines of said high-definition television system signal so that each five lines of said high-definition television system signal are converted into seven lines of said existing ordinary television system.

4. A method as claimed in claim 3, wherein said scan converting involves taking 1,125 lines of a complete high-definition television system signal and outputting 131.25 lines on each of 12 outputs of a scan converter.

5. A method as claimed in claim 4, wherein said controlling step comprises the step of causing said switcher to selectively combine groups of four of said 12 outputs of said scan converter.

6. A method as claimed in claim 1, wherein said controlling step controls said switch to choose which of said D/A-converted video signals are used to display said another portion of said high definition television system picture selectively replaced by said at least one ordinary television system picture.

7. A picture display system comprising:

means for receiving a high definition television system signal;

means for A-D converting said received high definition television system signal;

means for dividing said A-D converted signal into a plurality of video signals each having a format according to an existing ordinary television system;

means for D-A converting said divided signal;

switching means, provided separate from a plurality of existing ordinary television receivers, for receiving said D-A converted signal and sending it to said plurality of existing ordinary television receivers which comprises a display area, so that at least one high definition television system picture is displayed on at least one of said plurality of existing ordinary television receivers; and inputting means for inputting at least one ordinary television system picture independent from said high definition television system signal received by said mean for receiving;

wherein said switching means further comprises means for receiving said at least one ordinary television system picture input through said means for inputting; and means for selectively outputting said D-A converted signal and said at least one ordinary television system picture input through said inputting means to said plurality of existing ordinary television receivers.

8. A picture display system as claimed in claim 7, wherein said dividing means comprises means for scan converting the lines of said high definition television system signal so that each five lines of said high definition television system are converted into seven lines of said existing ordinary television system to provide said plurality of video signals.

9. A picture display system as claimed in claim 8, wherein said scan converting means takes 1,125 lines of a complete high definition television signal and outputs 131.25 lines on each of 12 outputs thereof.

10. A picture display system as claimed in claim 9, wherein said switching means selectively combines groups of four of said 12 outputs of said scan converter means.

* * * * *